(12) United States Patent
Renault et al.

(10) Patent No.: US 11,952,964 B2
(45) Date of Patent: Apr. 9, 2024

(54) SEALING JOINT FOR AIRCRAFT TURBOJET ENGINE NACELLE

(71) Applicant: Safran Nacelles, Gonfreville l'Orcher (FR)

(72) Inventors: Cédric Renault, Moissy Cramayel (FR); Arnaud Bonny, Moissy Cramayel (FR)

(73) Assignee: Safran Nacelles, Gonfreville l'Orcher (FR)

( * ) Notice: Subject to any disclaimer, the term of this patent is extended or adjusted under 35 U.S.C. 154(b) by 462 days.

(21) Appl. No.: 17/316,118

(22) Filed: May 10, 2021

(65) Prior Publication Data

US 2021/0404417 A1 Dec. 30, 2021

Related U.S. Application Data

(63) Continuation of application No. PCT/FR2019/052619, filed on Nov. 5, 2019.

(30) Foreign Application Priority Data

Nov. 9, 2018 (FR) .................................... 18/60404

(51) Int. Cl.
*F02K 1/80* (2006.01)
*F02K 1/72* (2006.01)

(52) U.S. Cl.
CPC ................ *F02K 1/805* (2013.01); *F02K 1/72* (2013.01); *F05D 2220/323* (2013.01); *F05D 2240/55* (2013.01)

(58) Field of Classification Search
CPC ...... F02K 1/805; F02K 1/72; F05D 2220/323; F05D 2240/55; F16J 15/027
See application file for complete search history.

(56) References Cited

U.S. PATENT DOCUMENTS 3,591,963 A * 7/1971 Kopp ..................... B64D 27/26
277/646
4,468,043 A * 8/1984 Brazel .................... F16J 15/065
277/921
(Continued)

FOREIGN PATENT DOCUMENTS

EP 2134951 12/2009
FR 2914957 A1 * 10/2008 ............ F01D 11/005
(Continued)

OTHER PUBLICATIONS

Search Report issued in corresponding RU Application 2021111541/12, dated Jan. 31, 2023, 2 pages.
(Continued)

*Primary Examiner* — Eugene G Byrd
(74) *Attorney, Agent, or Firm* — Burris Law, PLLC

(57) ABSTRACT

A sealing joint for an aircraft turbojet engine nacelle includes a bead designed to be mounted in a joint support. The sealing joint is characterized in that the bead includes a retaining projection which extends in a direction substantially transverse to a longitudinal axis of the sealing joint, the retaining projection being designed to extend through the joint support when the sealing joint is mounted in the support thereof and/or a sealing lip which extends under the bead in a direction substantially parallel to the longitudinal axis of the sealing joint and which is designed to be compressed on the joint support when the sealing joint is mounted in the support thereof.

12 Claims, 4 Drawing Sheets

(56) References Cited

U.S. PATENT DOCUMENTS

| | | | | |
|---|---|---|---|---|
| 4,470,608 | A * | 9/1984 | Warren | F16J 15/024 |
| | | | | 277/645 |
| H814 | H * | 9/1990 | Sherrell | 277/606 |
| 5,095,657 | A * | 3/1992 | Marsh | F24C 15/021 |
| | | | | 49/492.1 |
| 5,687,976 | A * | 11/1997 | Andrick | F16L 25/0054 |
| | | | | 277/607 |
| 10,502,320 | B2 * | 12/2019 | Ritoper | F16J 15/065 |
| 10,947,904 | B2 * | 3/2021 | Olson | B64D 29/06 |
| 2010/0044466 | A1 * | 2/2010 | Vauchel | F02K 1/70 |
| | | | | 239/265.11 |
| 2016/0369743 | A1 * | 12/2016 | Schrell | F02K 1/72 |
| 2018/0156051 | A1 * | 6/2018 | Strutt | F01D 11/003 |
| 2018/0298772 | A1 * | 10/2018 | Ratajac | F16J 15/065 |

FOREIGN PATENT DOCUMENTS

| | | | |
|---|---|---|---|
| FR | 2920215 | 2/2009 | |
| FR | 3070466 A1 * | 3/2019 | ............ B64D 29/06 |
| SU | 1399551 | 5/1988 | |
| WO | 2015036717 | 3/2015 | |
| WO | 2015052442 | 4/2015 | |
| WO | WO-2015052442 A1 * | 4/2015 | ............ F01D 11/005 |
| WO | WO-2017216468 A1 * | 12/2017 | ............ F16J 15/027 |
| WO | WO-2021014085 A1 * | 1/2021 | ............ B64D 29/00 |

OTHER PUBLICATIONS

International Search Report for International Application PCT/FR2019/052619, mailed Feb. 7, 2020.

* cited by examiner

SEALING JOINT FOR AIRCRAFT TURBOJET ENGINE NACELLE

CROSS-REFERENCE TO RELATED APPLICATIONS

This application is a continuation of International Application No. PCT/FR2019/052619, filed on Nov. 5, 2019, which claims priority to and the benefit of FR 18/60404 filed on Nov. 9, 2018. The disclosures of the above applications are incorporated herein by reference.

FIELD

The present disclosure relates to a seal for an aircraft turbojet engine nacelle thrust reverser, a sealing assembly including such a seal, a propulsion unit for an aircraft including such a sealing assembly, and a method for dismounting such a sealing assembly.

BACKGROUND

The statements in this section merely provide background information related to the present disclosure and may not constitute prior art.

An aircraft is driven by several propulsion units each comprising a turbojet engine which is housed in a nacelle. A nacelle generally has a tubular structure along a longitudinal axis comprising a fixed upstream section consisting of an air inlet upstream of the turbojet engine, a fixed middle section intended to surround a fan of the turbojet engine, and a downstream section which can accommodate a thrust reverser device and intended to surround the combustion chamber of the turbojet engine, the upstream and downstream of the nacelle being defined by reference to the flow direction of the airflow in the nacelle in direct jet operation, the upstream of the nacelle corresponding to a portion of the nacelle through which the airflow enters, and the downstream corresponding to an ejection zone of said airflow.

The role of a thrust reverser device is, during the landing of an aircraft, to improve the braking ability thereof by redirecting forward at least one part of the thrust generated by the turbojet engine. In this phase, the thrust reverser obstructs the flow path of the cold airflow passing through the nacelle, and directs the latter towards the front of the nacelle, thereby generating a counter-thrust which is added to the braking of the wheels of the aircraft.

The means implemented to achieve this reorientation of the cold flow vary depending on the thrust reverser type. However, in all cases, the structure of a thrust reverser comprises one or more movable cowl(s) which are displaceable between, on the one hand, a deployed position in which they open a passage within the nacelle intended for the diverted flow, and on the other hand, a retracted position in which they close this passage. These cowls can fulfill a function of deflection or simply actuation of other diverting means.

In the case of a cascade thrust reverser, also known as a cascade vane thrust reverser, the reorientation of the airflow is performed by cascade vanes, the thrust reverser cowl(s) having only one simple sliding function substantially along the longitudinal axis of the nacelle and aimed at uncovering or covering these cascades. Complementary blocking doors, also called flaps, activated by the sliding of the cowling, generally allow a closure of the flow path downstream of the cascades so as to improve the reorientation of the cold flow.

Such a thrust reverser 1 with cascades 3 is represented in FIG. 1. Generally, a seal 5 made of an elastomeric material is mounted on the cowl 7 and coming into contact with a deflection edge 9 of the turbojet engine 10 when the thrust reverser is in the closed position.

In this direct jet operating position, the air circulating in the cold air flow path 11 under the effect of the fan of the turbojet engine (not visible) must not be able to escape from this flow path in the direction of the cascades 3. The seal 5 provides this sealing.

Under the effect of the pressure exerted by the deflection edge 9, symbolized by the arrow 13 of FIG. 2 illustrating in an enlarged view the zone II of FIG. 1, the bead 15 of the seal 5 tends to come out of the seal support 17 which is mounted on the cowl 7. The seal then no longer provides its sealing function, and the performance losses are then increased.

The intervention required to put the seal 5 back in place in the support 17 thereof is expensive, and requires an immobilization of the aircraft.

In order to try to overcome this problem, one manages to glue the seal 5 to the bottom of the support 17 thereof. This, however, is not satisfactory, on the one hand, because despite the presence of glue, the seal tends to come out of the support thereof, and on the other hand, because the glue makes the operations of replacing the seal in the case of wear complicated.

SUMMARY

This section provides a general summary of the present disclosure and is not a comprehensive disclosure of its full scope or all of its features.

The present disclosure provides a seal for an aircraft turbojet engine nacelle, said seal including a bead intended to be mounted in a seal support, remarkable in that said bead includes:
  a plurality of retaining protrusions, extending in a direction which is substantially transverse to a longitudinal axis of said seal, said retaining protrusions being intended to pass through said seal support when said seal is mounted in the support thereof, and/or
  a sealing lip extending below said bead, in a direction which is substantially parallel to said longitudinal axis of said seal, designed to be compressed on the seal support when said seal is mounted in the support thereof.

Thus, by providing a seal including a retaining protrusion which is transverse to the longitudinal axis of the seal and intended to pass through the seal support when the seal is mounted in the support thereof, one reduces the need for the presence of glue between the seal and the support thereof. Compared to the prior art, the mounting and dismounting operations of the seal in the support thereof are then considerably simplified.

By providing a sealing lip which extends longitudinally under the bead of the seal and which is compressed on the seal support when the seal is mounted in the support thereof, the sealing of the assembly which includes the seal mounted in the support thereof is produced.

According to optional features of the seal according to the present disclosure:
  the seal includes a plurality of retaining protrusions which are spaced apart from each other;
  in one form, the retaining protrusions are regularly spaced apart from each other or are not regularly spaced apart from each other;

in one form, the retaining protrusions are distributed in a staggered manner relative to the longitudinal axis of the seal;

the retaining protrusion has a thickness which is less than or greater than or equal to the thickness of the bead of the seal;

the retaining protrusion may include a circumferential groove; and the sealing lip extends over a length which is less than or equal to the length of the bead of the seal, continuously or discontinuously.

The present disclosure also concerns a sealing assembly including:

a seal according to the present disclosure, and a seal support, in which the bead of said seal is mounted, remarkable in that the seal support includes a retaining orifice through which the retaining protrusions of said seal passes and in that the sealing lip of said seal is compressed on said seal support.

The present disclosure also concerns a propulsion unit for an aircraft including a turbojet engine and a nacelle supporting said turbojet engine, said nacelle including a cascade thrust reverser device including a cowl, which is movable between a retracted position providing an aerodynamic continuity of the nacelle for an operation of the nacelle in direct jet mode and between a deployed position defining an annular passage in the nacelle for an operation of the nacelle in reverse jet mode, said propulsion unit being remarkable in that it includes a sealing assembly according to the present disclosure, in which the seal includes a sealing body supported by the bead of said seal, said sealing body being in contact with a deflection edge of the turbojet engine.

The present disclosure further concerns a method for dismounting a sealing assembly according to the disclosure, remarkable in that it includes a step aimed at cutting the retaining protrusion at the portion thereof which passes through the retaining orifice of the seal, then at removing the seal from the support thereof.

Further areas of applicability will become apparent from the description provided herein. It should be understood that the description and specific examples are intended for purposes of illustration only and are not intended to limit the scope of the present disclosure.

DRAWINGS

In order that the present disclosure may be well understood, there will now be described various forms thereof, given by way of example, reference being made to the accompanying drawings, in which.

Figure 1:
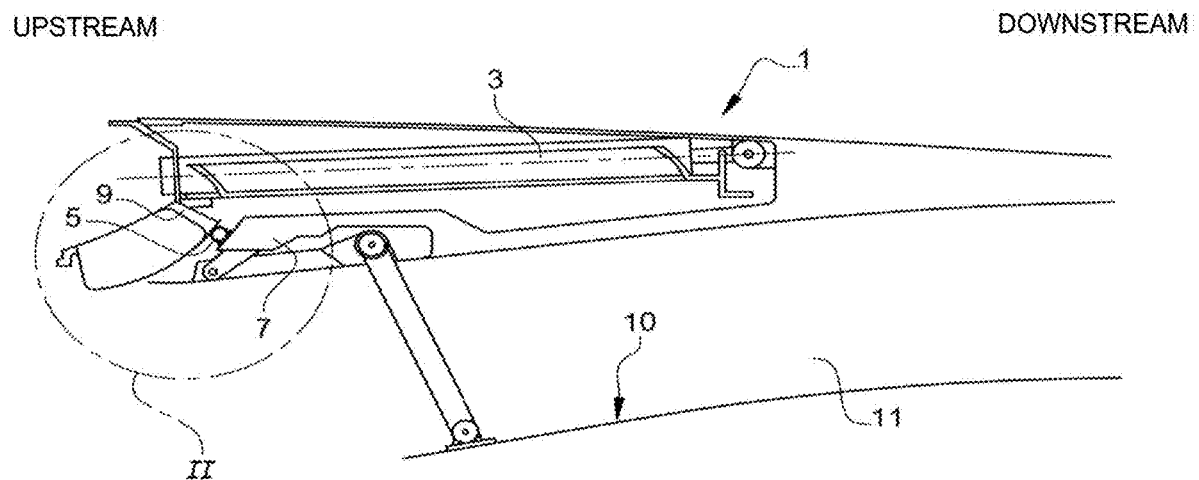
FIG. 1 is a schematic view of a cascade thrust reverser provided with a seal, according to an embodiment of the prior art.
Figure 2:
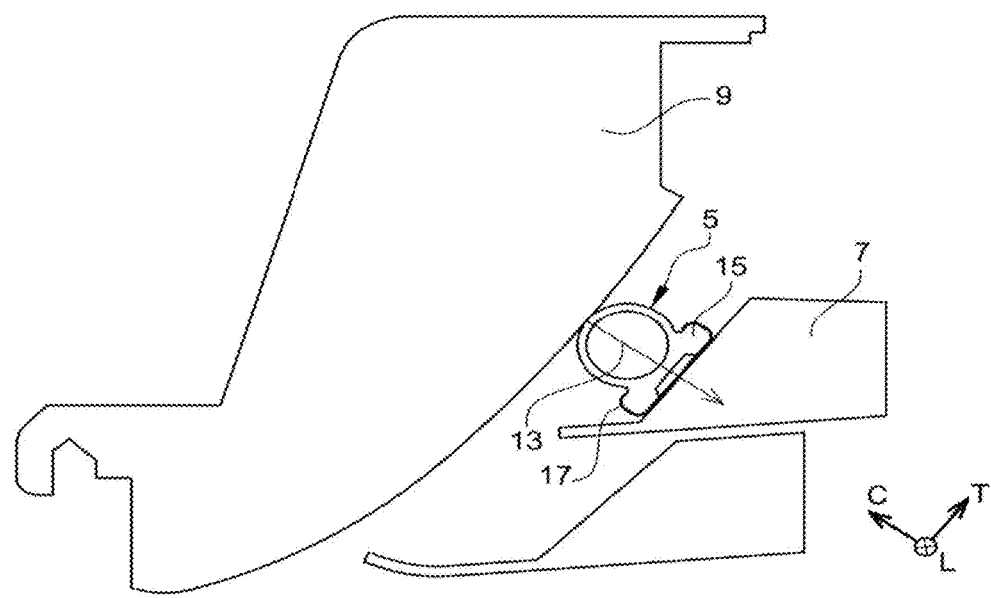
FIG. 2 is a detail view of the zone II of FIG. 1.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the description and in the claims, the terms "upstream" and "downstream" must be understood relative to the circulation of the airflow inside the propulsion unit formed by the nacelle and the turbojet engine, that is to say from left to right with reference to FIG. 1.

Furthermore, in all Figures, identical or similar references represent identical or similar members or sets of members.

Figure 3:
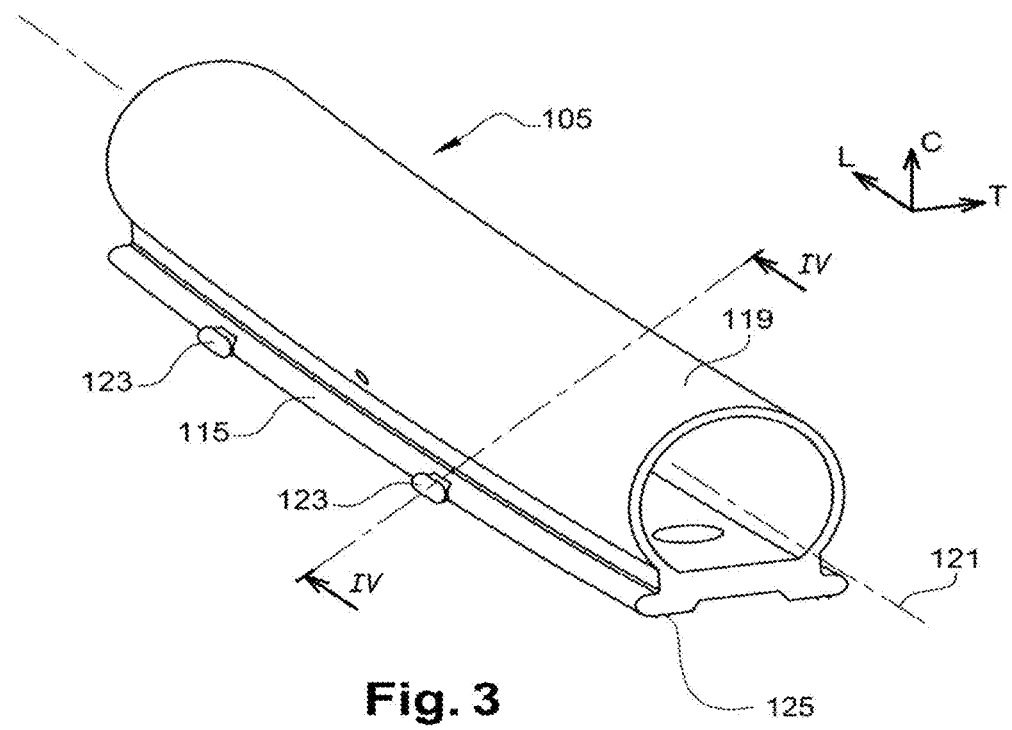
FIG. 3 illustrates the seal according to the disclosure, in isometric view.

Reference is made to FIG. 3 illustrating the seal 105 according to the present disclosure in isometric view.

The seal 105 comprises a tubular body 119 extending substantially along a longitudinal axis 121 and a bead 115 supporting the body 119. In the description and the claims, the terminology "longitudinal", "compression" and "transverse" will be adopted without limitation with reference to the direct trihedron L, V, T which is indicated in the Figures, whose longitudinal axis L is parallel to the longitudinal axis of the seal.

The body 119 of the seal is represented in FIG. 3 as having a generally circular cross section (along the plane CT). Of course, this body 119 can have a cross section of a different shape, for example rectangular, triangular, etc.

The body 119 of the seal 105 is for example intended to come into contact with a deflection edge of the turbojet engine in order to provide a sealing when the movable cowl of the thrust reverser device is in the retracted position in which it provides an aerodynamic continuity of the nacelle for an operation of the nacelle in direct jet mode. To this end, the body 119 of the seal 105 is made of an elastomeric material.

According to the disclosure, the bead 115 of the seal 105 includes a plurality of retaining protrusions 123 or lugs.

The retaining protrusions 123 extend in a direction which is substantially transverse relative to the longitudinal axis 121 of the seal. The retaining protrusions 123 may be spaced apart from each other along the longitudinal axis 121 of the seal 105. By way of example, a distance of 50 mm to 100 mm can separate two consecutive retaining protrusions 123.

In some forms, the retaining protrusions are regularly spaced apart from each other.

Alternatively, the retaining protrusions are irregularly spaced apart from each other.

In one form, the retaining protrusions 123 are distributed in a staggered manner relative to the longitudinal axis 121 of the seal. According to one variant, the retaining protrusions 123 may be distributed face to face with each other relative to the longitudinal axis 121 of the seal 105. According to yet another variant which is not represented, the retaining protrusions 123 are distributed along only one side of the seal.

In one variation, each retaining protrusion 123 adopts a generally oblong shape. The thickness of the retaining protrusion 123 is for example less than that of the bead 115 of the seal 105. According to one variant which is not represented, the thickness of the retaining protrusion 123 may be equal to that of the bead 115 of the seal. According to another variant which is not represented, the thickness of the retaining protrusion may be greater than that of the bead of the seal.

In one form, the retaining protrusion 123 is made of a material identical to that used to obtain the bead 115 of the seal 105, that is to say of an elastomeric material. Alternatively, it may be considered to make the retaining protrusion of a different material, such as plastic or metal.

As will be seen in the following description, the retaining protrusions 123 are each intended to pass through an orifice of a seal support 117 in which the seal 105 is mounted. Thus, the retaining protrusion 123 provides the function of holding the seal 105 in the support thereof.

Figure 4:
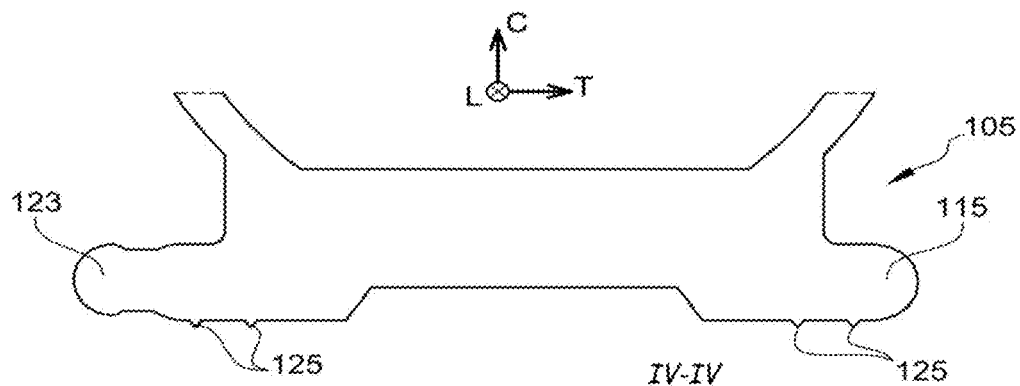
FIG. 4 is a partial sectional and enlarged view along the line IV-IV of FIG. 3.

Reference is made to FIG. 4 for a better visibility, which is a view in a partial and enlarged section, along the line IV-IV of FIG. 3.

According to the present disclosure, the bead 115 of the seal 105 may, alternatively or in combination with the retaining protrusions 123, include a set of sealing lips 125 or gadroons extending below the bead 115.

According to the represented example, four sealing lips 125 extend below the bead 115 of the seal 105. Of course, it can be considered to provide, according to a variant which is not represented, more sealing lips, or on the contrary to provide less thereof.

The sealing lips 125 extend below the bead 115 of the seal 105 in a direction which is substantially parallel to the longitudinal axis 121 of the seal 105. According to a variant which is not represented, the sealing lips 125 extend below the bead 115 of the seal 105 in a geometric pattern which may represent crenellations, chevrons, zigzags, etc.

As will be seen in the following description, the sealing lips 125 are designed to be compressed on the seal support 117 which receives the seal when. For this purpose, in one form, the material used to make the sealing lips 125 is an elastomeric material. The presence of these sealing lips 125 provides the sealing of the assembly formed by the seal and the support thereof when the seal is biased, for example when the deflection edge exerts a pressure on the body of the seal. Indeed, the presence of these sealing lips 125 allows the seal to exert a greater pressure on the seal support 117, relative to a mounting according to the prior art.

The sealing lips 125 may extend over the entire length of the bead 115 of the seal 105, or alternatively over only one portion of this length.

Also, the sealing lips 125 may extend along the bead 115 of the seal 105 continuously or discontinuously.

Figure 5:
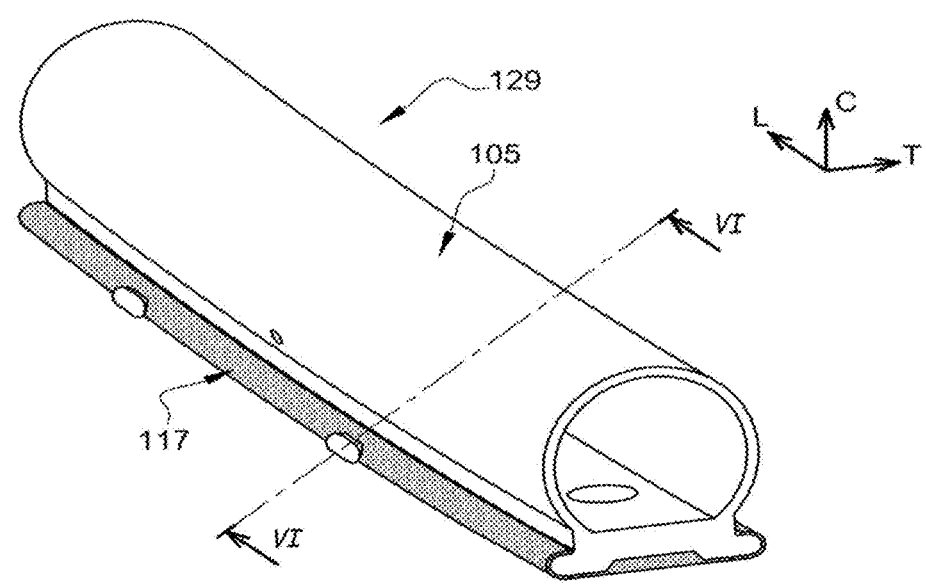
FIG. 5 illustrates the sealing assembly, according to the teachings of the present disclosure.
Figure 6:
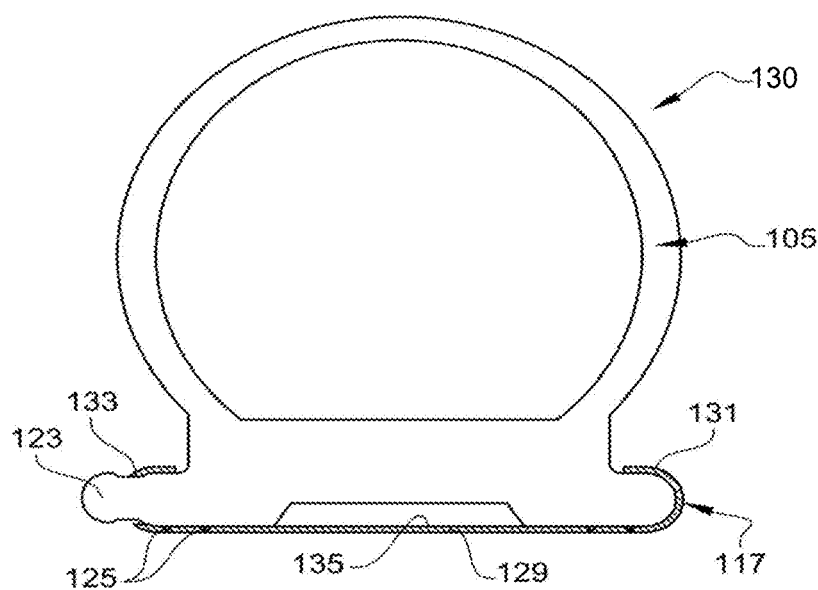
FIG. 6 illustrates the sealing assembly in cross section along the line VI-VI of FIG. 5.

Referring now to FIGS. 5 and 6. FIG. 5 illustrates in isometric view the seal 105 which is mounted in the seal support 117 thereof, so as to define a sealing assembly 129. In order to provide a good holding of the seal 105 in the support 117 thereof, in one form, the support is made of a metal material.

The joint support 117 adopts a shape which is generally complementary to that of the bead 115 of the seal 105. For this purpose, as best shown in FIG. 6 illustrating the sealing assembly in cross section along the line VI-VI, the seal support 117 includes a central portion 130 and two end portions 131 curved on the inside of the seal 105. Such a support typically has a "C"-shaped cross section (along the plane CT), of a shape complementary to that defined by the bead 115 of the seal 105.

The mounting of the seal in the support thereof can for example be obtained by inserting manually or thanks to a tool the base 115 of the seal 105 in the support 117 thereof.

According to the disclosure, the seal support 117 includes a plurality of retaining orifices 133 arranged in the support so as to be passed through by the retaining protrusions 123 or lugs. The retaining orifices 133 are thus arranged at the end portions 131 of the seal support 117.

In addition, as previously mentioned, the sealing lips 125 of the seal 105 are compressed on the seal support 117, at the upper wall 135 of the central portion 130.

Figure 7:
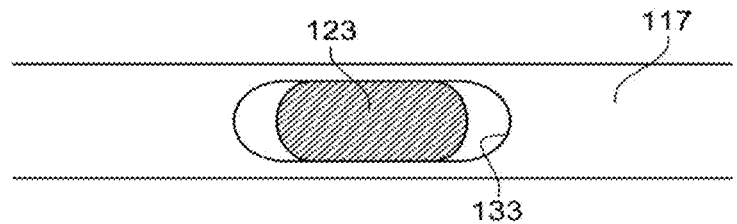
FIG. 7 is a view of the sealing assembly which is centered on the retaining protrusion and representing a first variant of the retaining orifice, according to the teachings of the present disclosure.

As represented in FIG. 7 which is a view of the sealing assembly centered on the retaining protrusion 123, the retaining protrusion 123 may partially occupy the retaining orifice 133 through which it passes. The retaining orifices 133 can be closed, as represented in FIG. 7.

Figure 8:
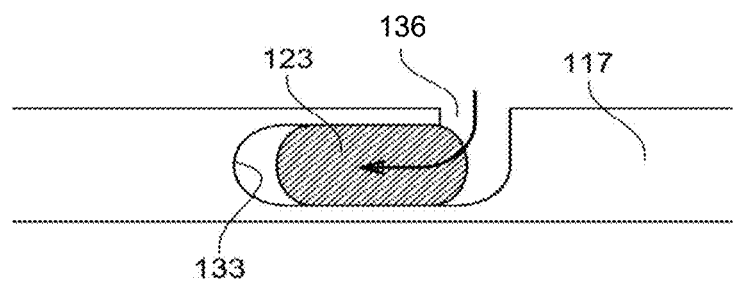
FIG. 8 is a view similar to FIG. 7, representing a second variant of the retaining orifice, according to the teachings of the present disclosure.

According to a variant represented in FIG. 8, the retaining orifices 133 can be opened. For this purpose, the seal support 117 includes an opening 136 communicating with the orifice 133.

Also, according to a variant which is not represented in the figures, the retaining protrusion 123 may include a circumferential groove allowing further simplifying the mounting of the seal in the support thereof, and further increasing the mechanical strength of the seal in the support thereof.

The present disclosure also includes a method for dismounting the sealing assembly 129. According to this method, the retaining protrusions 123 of the seal 105 are cut out, at the portion thereof which passes through the retaining orifice 133 of the seal (that is to say the prominent portion). This then allows removing the seal 105 from the support 117 thereof, for example to replace it in the case of damage.

Of course, the present disclosure is not limited to the only variations of this seal 105 and this sealing assembly, described hereinabove only by way of illustrative examples, but it encompasses, on the contrary, all variants involving the technical equivalents of the described means as well as the combinations thereof if these fall within the scope of the disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the present disclosure is merely exemplary in nature and, thus, variations that do not depart from the substance of the present disclosure are intended to be within the scope of the disclosure. Such variations are not to be regarded as a departure from the spirit and scope of the disclosure.

What is claimed is:

1. A seal for an aircraft turbojet engine nacelle, said seal comprising a bead intended to be mounted in a seal support, wherein said bead comprises:
- a plurality of retaining protrusions spaced apart from each other, extending in a direction substantially transverse to a longitudinal axis of said seal, said plurality of retaining protrusions being configured to pass through said seal support when said seal is mounted in the seal support thereof, and/or
- a sealing lip extending below said bead, in a direction substantially parallel to said longitudinal axis of said seal, configured to be compressed on the seal support when said seal is mounted in the seal support thereof.

2. The seal according to claim 1, wherein the plurality of retaining protrusions are regularly spaced apart from each other.

3. The seal according to claim 1, wherein the plurality of retaining protrusions are not regularly spaced apart from each other.

4. The seal according to claim 1, wherein the plurality of retaining protrusions are distributed in a staggered manner relative to the longitudinal axis of the seal.

5. The seal according to claim 1, wherein at least one of the plurality of retaining protrusions has a thickness less than or greater than or equal to the thickness of the bead of the seal.

6. The seal according to claim 1, wherein at least one of the plurality of retaining protrusions includes a circumferential groove.

7. The seal according to claim 1, wherein the sealing lip extends over a length less than or equal to the length of the bead of the seal.

8. The seal according to claim 7, wherein the sealing lip extends continuously over the length.

9. The seal according to claim 7, wherein the sealing lip extends discontinuously over the length.

10. A sealing assembly comprising:
- a seal according to claim 1; and
- a seal support in which the bead of said seal is mounted, wherein the seal support comprises retaining orifices through which the plurality of retaining protrusions of said seal passes and in that the sealing lip of said seal is compressed on said seal support.

11. A propulsion unit for an aircraft, the propulsion unit comprising:
- a turbojet engine; and
- a nacelle supporting said turbojet engine, said nacelle comprises a cascade thrust reverser device comprising a cowl, wherein the cowl is movable between a retracted position providing an aerodynamic continuity of the nacelle for an operation of the nacelle in direct jet mode and between a deployed position defining an annular passage in the nacelle for an operation of the nacelle in reverse jet mode, wherein said propulsion unit comprises a sealing assembly according to claim 10, wherein the seal comprises a sealing body supported by the bead of said seal, said sealing body being in contact with a deflection edge of the turbojet engine.

12. A method for dismounting a sealing assembly defined according to claim 10, wherein the method comprises a step of cutting the plurality of retaining protrusions at a portion thereof which passes through the one or more retaining orifices of the seal, then removing the seal from the seal support.

* * * * *